Oct. 7, 1958 J. B. HOWZE 2,854,954
VEHICLE BRAKE OPERATING MECHANISM
Filed Sept. 26, 1956

INVENTOR.
JAMES B. HOWZE
BY
Malcolm W. Fraser
ATTORNEY

United States Patent Office 2,854,954
Patented Oct. 7, 1958

2,854,954

VEHICLE BRAKE OPERATING MECHANISM

James B. Howze, Norwalk, Calif., assignor, by mesne assignments, to Insley Manufacturing Corporation, Indianapolis, Ind., a corporation of Indiana Application September 26, 1956, Serial No. 612,197

1 Claim. (Cl. 121—38)

This invention relates to brake operating mechanism for vehicles but particularly trucks and is concerned with service and parking brake devices.

An object is to produce a simple and efficient brake operating device which is pressure fluid operated and is so designed that upon failure of or predetermined reduction in fluid pressure, the brake is automatically applied, the brake device being such that it can be economically manufactured, is sturdy in construction, easy to assemble and install and has the new and improved features of construction, arrangement and operation hereinafter described.

Figure 1:
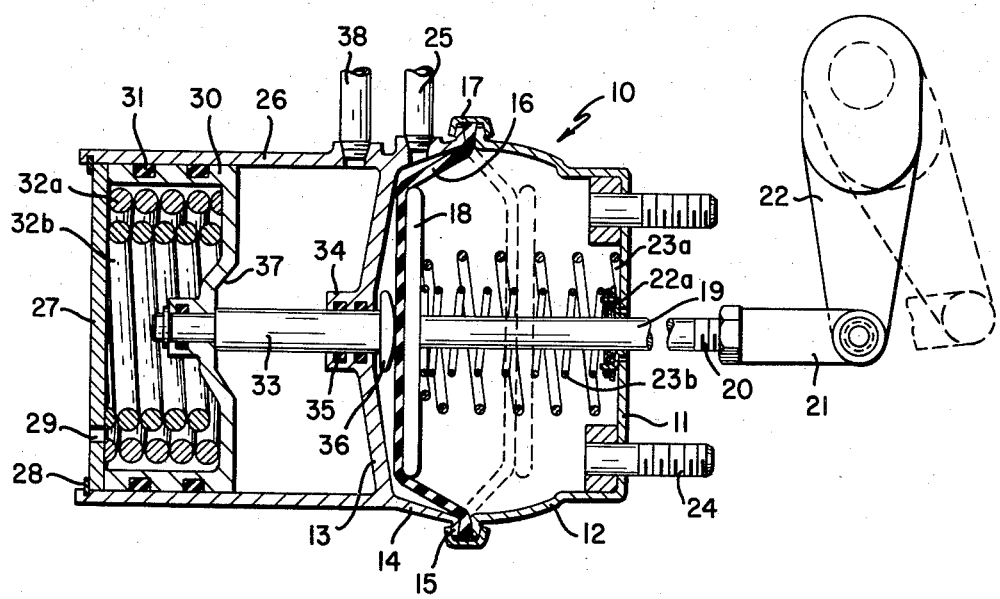
Figure 2:
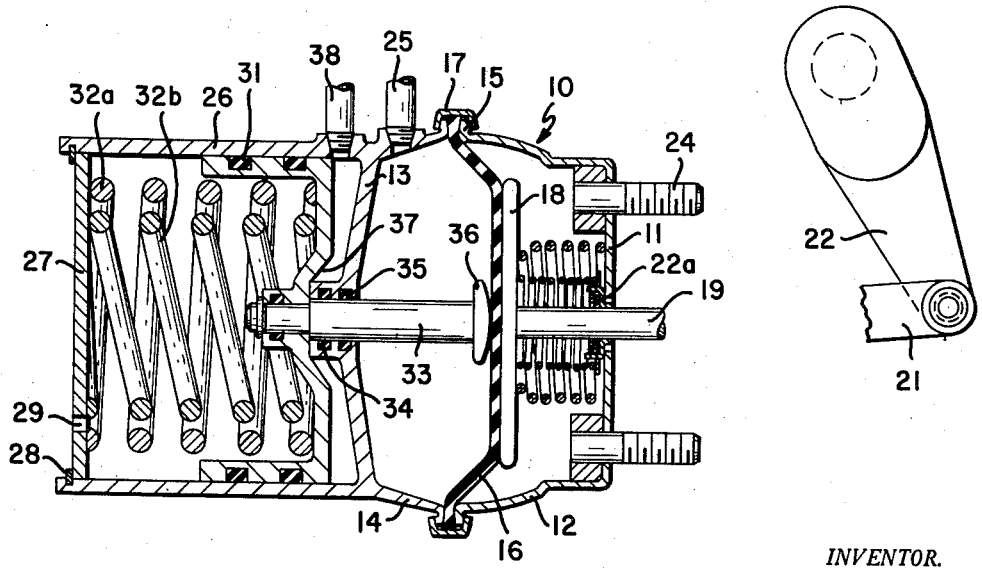

Other objects and advantages will hereinafter appear and, for purposes of illustration but not of limitation, an embodiment of the invention is shown on the accompanying drawings, in which Figure 1 is a longitudinal sectional elevation of a vehicle brake device constituting both the service and parking brake unis and showing the service brake connected to a brake operating arm, the service brake operating diaphragm being shown in broken lines in an operative position; and Figure 2 is a view similar to Figure 1 showing the parking brake mechanism in its operative position.

The illustrated embodiment of the invention comprises a vehicle brake operating device having a housing 10 consisting of a cup-shaped outer part having an outer flat end wall 11 and cylindrical side walls 12, and also a cup-shaped inner part having an end wall 13 which is slightly inwardly dished and an outwardly flared cylindrical side wall 14. The free edges of the side walls 12 and 14 are outwardly flanged as indicated at 15 to clamp the peripheral edge portion of a flexible diaphragm 16 therebetween. A band 17 encircles the flanged portion 17 and is crimped in place thereby to hold the housing parts together and to retain the peripheral portion of the diaphragm securely clamped in position. Stud bolts 24 enable the housing to be suitably mounted on a vehicle.

Disposed within the housing 10 engaging the major portion of the outer side of the diaphragm 16 is a circular disc-like pad 18 and rigid with the outer side of the pad 18 and disposed centrally thereof is a brake operating rod 19 which projects through an opening in the end wall 11 and has an adjustable connection 20 with a clevis 21. The clevis 21 is suitably connected to a brake operating arm 22 which is appropriately connected to the vehicle brake mechanism (not shown). Since the vehicle brake mechanism per se forms no part of the present invention and since the construction and operation thereof are well known to those skilled in this art, description and illustration thereof are not deemed necessary.

A suitable gasket unit 22a surrounds the brake operating rod 19 in the region of the hole through the end wall 11 and also provides a seat for the outer end of a coil spring 23b, the opposite end of which abuts against the outer side of the pad 19. Thus the spring also serves to retain the gasket unit 22a in place as well as assisting in returning the pad 18 and diaphragm 16 to its left-hand or inoperative position. On the outside of and concentric with the spring 23b is a somewhat stronger spring 23a which bears respectively against the end wall 11 and the outer side of the pad 18.

Fluid such as air under pressure is introduced in back of the diaphragm 16 through a tube 25, the arrangement being such that when the diaphragm is in its inoperative position as shown by the full lines in Figure 1 adequate space is afforded in rear of the diaphragm to admit the air under pressure for forcing the diaphragm to the right as shown by the broken lines on Figure 1 and thereby forcing the brake operating rod 19 to the right thereby to apply the vehicle brakes for service conditions.

As shown on the drawings at the left of the end wall 13 is a piston cylinder having circular cylinder walls 26 which are integral at their inner end with the end wall 13 and are open at the outer ends. Closing the outer end of the cylinder is a detachable outer end wall or plate 27, which is normally held in place by a snap ring 28. In the end wall 27 is a vent hole 29 which as will hereinafter appear enables the piston to move to the left of the cylinder, the air being forced out through the hole 29. Disposed within the cylinder 26 and having a sliding fit therein is a cup shaped piston 30 provided with a pair of sealing rings 31 of suitable material to prevent the escape of fluid such as air under pressure from the right hand side of the piston. As shown the cup-shaped piston 30 has an imperforate inner wall and an open outer end and disposed within the piston is a pair of concentric compression springs 32a and 32b which bear respectively against the end wall 27 and the bottom of the piston, these springs urging the piston at all times to the right of the cylinder 26 or to the position shown on Figure 2.

Fixedly secured to the central portion of the end wall of the piston 30 is a piston rod 33 which extends slidingly through a boss 35 which is integral with and projects inwardly from the inner housing end wall 13. The boss 34 carries packing 35 to effect a fluid tight seal for militating against the escape of pressure fluid from the diaphragm chamber. On the outer end of the piston rod 33 and disposed within the housing 10 is an integral pad 36 which is relatively small and somewhat dome-like at its outer end which engages a central portion of the diaphragm 16. Thus when the compression springs 32a and 32b are released the pad presses against the diaphragm and through the diaphragm against the relatively large disc-like pad 18 to impart brake actuating movement to the operating rod 19. It will be noted that in the central portion of the end wall of the piston 30 is a dished portion 37 which abuts against the end of the boss 34 to limit the right hand movement of the piston when same is actuated by the compression springs. In such position, however, the inlet for pressure fluid through the tube 38 is not covered, thereby to enable pressure fluid to enter the tube 38 and drive the piston 30 to its left hand position shown in Figure 1 compressing the compression springs 32a and 32b.

From the above description it will be manifest that upon introducing pressure fluid such as air through the tube 25 the diaphragm 16 is forced to the broken line position shown in Figure 1 and forcing the brake operating rod 19 to the right and thereby applying the brake through the usual operating connections. When the pressure fluid is released from the tube 25, the coil springs 23a and 23b return the brake operating rod 19 and the diaphragm 16 to the full line position shown in Figure 1 and thereby releasing the vehicle brake.

Normally the air is introduced through the tube 38 to maintain the piston 30 in its left hand position as shown in Figure 1, compressing the coil springs 32a and 32b. However for parking purposes, the pressure in the tube 38 is reduced or eliminated, whereupon the coil springs abruptly snap the piston rod 33 to its right hand position as shown in Figure 2 which operates to actuate the brake operating rod 19 to its operative brake applying position. Thus the parking brake is applied. Manifestly in the event that something happens to the source of pressure fluid or the pressure is reduced below a predetermined point, the coil springs 32a and 32b overcome any pressure at the right of the piston 30 and accordingly apply the vehicle brake automatically.

It will be observed that an exceedingly compact unit is provided which can be readily applied to a vehicle. In view of its unitary arrangement both the service and parking brakes are made readily available and free from installation and service difficulties. Thus the compact construction and arrangement lends itself not only to convenient installation but to economical and practical manufacturing operations.

Numerous changes in details of construction arrangement and operation may be effected without departing from the spirit of the invention, especially as defined in the appended claim.

What I claim is:

Brake actuating mechanism comprising a closed housing having inner and outer end walls, a flexible diaphragm within said housing and peripherally secured in place, means for introducing fluid under pressure to said housing adjacent the inner end wall thereof and at one side of said diaphragm, a brake operating rod on the other side of said diaphragm and axially arranged relative thereto, said rod projecting through the outer end wall of said housing for reciprocatory movements, relatively light coil spring means within said housing for urging said rod and the diaphragm in a direction toward the inner end wall of the housing, a relatively large disc-like pad on the inner end of said brake rod, said coil spring means bearing at one end against said disc-like pad and at the other end against the outer end wall of said housing, an auxiliary cylinder at one end of said housing and having an outer end wall, the inner end wall of said housing constituting also the inner end wall of said cylinder, a cup-shaped piston slidably fitting said cylinder with the open end thereof facing the outer end wall of said cylinder, coiled compression spring means seating within the cup-shaped portion of said piston and abutting said outer cylinder end wall, the skirt of said piston engaging the outer end wall of the cylinder before the coil compression spring means is compressed solid, said outer cylinder end wall being vented to afford piston movement, a piston rod fixed at one end to said piston and having a sliding fit in said common inner wall for said housing and cylinder, a boss projecting from the central portion of said common inner wall into said cylinder, packing in said boss providing a fluid-tight seal about said piston rod, a central dished portion in said piston engageable with said boss for limiting the inward piston movement, a pad on the inner end of said piston rod, disposed within said housing and bearing against the central portion of said diaphragm, and means for introducing fluid under pressure to said cylinder adjacent said common inner wall for normally holding the piston in the region of the outer end wall of the cylinder thereby to hold said coiled compression means under compression, whereby upon failure of or predetermined reduction in fluid pressure, said coiled compression means actuates the piston and through the piston rod said brake operating rod is actuated.

References Cited in the file of this patent
UNITED STATES PATENTS

| | | |
|---|---|---|
| 2,318,798 | Piron | May 11, 1943 |
| 2,726,738 | Fawick | Dec. 13, 1955 |
| 2,754,805 | Beman | July 17, 1956 |